(12) United States Patent
Ando et al.

(10) Patent No.: US 9,461,327 B2
(45) Date of Patent: Oct. 4, 2016

(54) SOLID OXIDE FUEL CELL AND METHOD FOR PRODUCING THE SAME

(71) Applicant: TOTO LTD., Kitakyushu-shi, Fukuoka (JP)

(72) Inventors: Shigeru Ando, Odawara (JP); Osamu Okamoto, Chigasaki (JP); Kiyoshi Hayama, Fujisawa (JP); Seiki Furuya, Fujisawa (JP); Yutaka Momiyama, Yokohama (JP); Nobuo Isaka, Yokohama (JP); Masaki Sato, Fujisawa (JP); Shuhei Tanaka, Chigasaki (JP); Takuya Hoshiko, Kanagawa (JP); Naoki Watanabe, Chigasaki (JP); Yasuo Kakinuma, Chigasaki (JP)

(73) Assignee: TOTO LTD., Kitakyushu-Shi, Fukuoka (JP)

( * ) Notice: Subject to any disclaimer, the term of this patent is extended or adjusted under 35 U.S.C. 154(b) by 237 days.

(21) Appl. No.: 14/229,164

(22) Filed: Mar. 28, 2014

(65) Prior Publication Data

US 2014/0295318 A1 Oct. 2, 2014

(30) Foreign Application Priority Data

Mar. 28, 2013 (JP) ................................. 2013-070116
Mar. 27, 2014 (JP) ................................. 2014-066707

(51) Int. Cl.
*H01M 8/12* (2016.01)
*H01M 8/00* (2016.01)
*H01M 8/02* (2016.01)

(52) U.S. Cl.
CPC ........... *H01M 8/1286* (2013.01); *H01M 8/004* (2013.01); *H01M 8/0236* (2013.01); *H01M 8/0243* (2013.01); *H01M 8/0245* (2013.01); *H01M 8/0252* (2013.01); *H01M 8/124* (2013.01); *H01M 8/1226* (2013.01); *H01M 8/1246* (2013.01); *H01M 2300/0074* (2013.01); *Y02E 60/521* (2013.01); *Y02E 60/525* (2013.01); *Y02P 70/56* (2015.11)

(58) Field of Classification Search
CPC ........... H01M 8/0243; H01M 8/0245; H01M 8/0252; H01M 8/1226; H01M 8/124; H01M 8/004; H01M 8/0236; H01M 8/1286; H01M 8/1246; H01M 2300/0074; Y02E 60/525; Y02E 60/521; Y02P 70/56
See application file for complete search history.

(56) References Cited

U.S. PATENT DOCUMENTS

| | | | | |
|---|---|---|---|---|
| 4,777,092 | A * | 10/1988 | Kawakami | B32B 18/00 257/E23.009 |
| 7,033,690 | B1 | 4/2006 | Akikusa et al. | |
| 2001/0041278 | A1* | 11/2001 | Hashimoto | H01M 4/9033 429/489 |
| 2005/0084733 | A1* | 4/2005 | Tarver | H01M 8/0206 429/495 |
| 2010/0151217 | A1* | 6/2010 | Kanada | H01L 23/15 428/217 |

FOREIGN PATENT DOCUMENTS

| | | |
|---|---|---|
| JP | 11-335164 A | 12/1999 |
| JP | 2002-015756 A | 1/2002 |
| JP | 2005-093241 A | 4/2005 |
| JP | 2013/026647 A1 | 2/2013 |

* cited by examiner

*Primary Examiner* — Muhammad Siddiquee
(74) *Attorney, Agent, or Firm* — Brinks Gilson & Lione; G. Peter Nichols

(57) ABSTRACT

Disclosed is a solid oxide fuel cell which includes an inner electrode, a solid electrolyte, and an outer electrode, each being sequentially laminated on the surface of a porous support. The porous support contains forsterite, and further has a strontium element concentration of 0.02 mass % to 1 mass % both inclusive in terms of SrO based on the mass of the forsterite.

7 Claims, 9 Drawing Sheets

SOLID OXIDE FUEL CELL AND METHOD FOR PRODUCING THE SAME

RELATED APPLICATIONS

This application claims priority under 35 U.S.C. §119 to Japanese Patent Application Nos. 2013-070116 filed on Mar. 28, 2013 and 2014-066707 filed on Mar. 27, 2014, the entire contents of which are hereby incorporated by reference.

BACKGROUND OF THE INVENTION

1. Field of the Invention

The present invention relates to a solid oxide fuel cell and a method for producing the same.

2. Description of the Related Art

In order to provide a solid oxide fuel cell at a low cost, it has been proposed that a support is prepared from a sintered compact made of forsterite (see Japanese Patent Application Publication No. 2005-93241). Additionally, JP-A 2005-93241 discloses that since forsterite has a similar thermal expansion coefficient to that of the solid electrolyte, this makes it possible to prevent cracks and gas leakage in the fuel cell.

SUMMARY OF THE INVENTION

An object of the present invention is to provide a fuel cell using forsterite for a support, the fuel cell having high power generation performance and long-term stability.

The present inventors have found that blending a porous support containing forsterite with strontium increases the strength of the porous support, and also increases the diameter of communicating pores and the porosity that influence gas permeability. The present invention has been made based on these findings. Specifically, the present invention relates to a solid oxide fuel cell comprising a porous support, an inner electrode, a solid electrolyte, and an outer electrode, each of the inner electrode, the solid electrolyte, and the outer electrode being sequentially laminated on a surface of the porous support. The porous support contains forsterite, and further has a strontium element concentration of 0.02 mass % to 1 mass % both inclusive in terms of SrO based on a mass of the forsterite. When the porous support contains strontium in the predetermined concentration, primary particles grow by firing, forming sintered particles of the porous support, and thereby the strength is presumably improved. The pores also grow as the primary particles grow by firing; as a result, the diameter of the communicating pores influencing the gas permeability is also increased presumably. Note that, generally, a correlation is observed between the porosity and the strength; the larger the porosity, the lower the strength. Nevertheless, in the present invention, the porous support is blended with strontium. This makes it possible to increase the porosity without lowering the strength of the porous support (rather, the strength is increased). Thus, the present invention makes it possible to increase the porosity and also to increase the diameter of the communicating pores, that is, to improve the gas permeability of the porous support, while increasing the strength of the porous support. Hence, the present invention improves and stabilizes the power generation performance of the solid oxide fuel cell (i.e., the durability is increased).

In the present invention, the solid electrolyte preferably contains lanthanum-gallate-based oxide, and the solid electrolyte more preferably contains lanthanum-gallate-based oxide doped with Sr and Mg. With the lanthanum-gallate-based oxide (preferably LSGM), electrical power can be generated in an operation temperature range as low as 600° C. to 800° C., making it hard for a chemical change to occur in the porous support.

Moreover, the lanthanum-gallate-based oxide doped with Sr and Mg contained in the solid electrolyte is preferably represented by the general formula $La_{1-a}Sr_aGa_{1-b-c}Mg_{b-c}Co_cO_3$, where $0.05 \le a \le 0.3$, $0 < b < 0.3$, and $0 \le c \le 0.15$.

In the present invention, an inner electrode side surface region of the porous support preferably has no calcium element (Ca) or has a calcium element concentration of 0.2 mass % or less in terms of CaO in a surface region at the inner electrode side. The lower calcium element concentration in the surface of the porous support can prevent the diffusion of the dopant of the lanthanum-gallate-based oxide during firing (in the process of producing the cell). Prevention of the diffusion of the dopant enables the crystal structure of the solid electrolyte to be maintained, so that the power generation performance is stable for a long period. Ca contained in the porous support is moved out of the porous support by firing, and combines with other elements moved from other layers, thereby forming a diffusion layer between the support and the inner electrode. The lower calcium element concentration in the porous support can prevent formation of the diffusion layer containing Ca and the other elements. Moreover, it is possible to maintain the crystal structure of the solid electrolyte even after the firing. Further, the dopant Sr contained in the lanthanum-gallate-based oxide is readily separated from the crystal by Ca contained in the porous support, and forms a diffusion layer together with Ca. Thus, when the solid electrolyte contains the lanthanum-gallate-based oxide doped with Sr and Mg, it is important to reduce the calcium element concentration contained in the porous support in order to maintain the crystal structure of the lanthanum-gallate-based oxide after the firing. The porous support is preferably composed of a compact including at least two layers. The porous support having at least two layers can include a layer having a low Ca concentration and another layer having a relatively high Ca concentration and a high strength, the Ca concentration being attributable to the separation of the dopant from the solid electrolyte. Hence, a high-performance cell can be readily produced. In addition, the porous support preferably has a sulfur concentration of less than 0.01 mass %. If the sulfur concentration is 0.01 mass % or more, NiO in the fuel electrode laminated on the porous support is poisoned by sulfur. In the case where the porous support has a sulfur concentration of less than 0.01 mass %, a stable power generation performance is obtained.

Moreover, the present invention relates to a method for producing a porous support for a solid oxide fuel cell, the solid oxide fuel cell including the porous support, an inner electrode, a solid electrolyte, and an outer electrode, each of the inner electrode, the solid electrolyte, and the outer electrode is sequentially laminated on a surface of the porous support, the method including forming the porous support by firing a compact including forsterite and further having a strontium element concentration of 0.02 mass % to 1 mass % both inclusive in terms of SrO based on a mass of the forsterite.

The present invention makes it possible to provide a fuel cell having a high power generation performance and an excellent long-term stability.

DETAILED DESCRIPTION OF THE PREFERRED EMBODIMENTS

Figure 1:
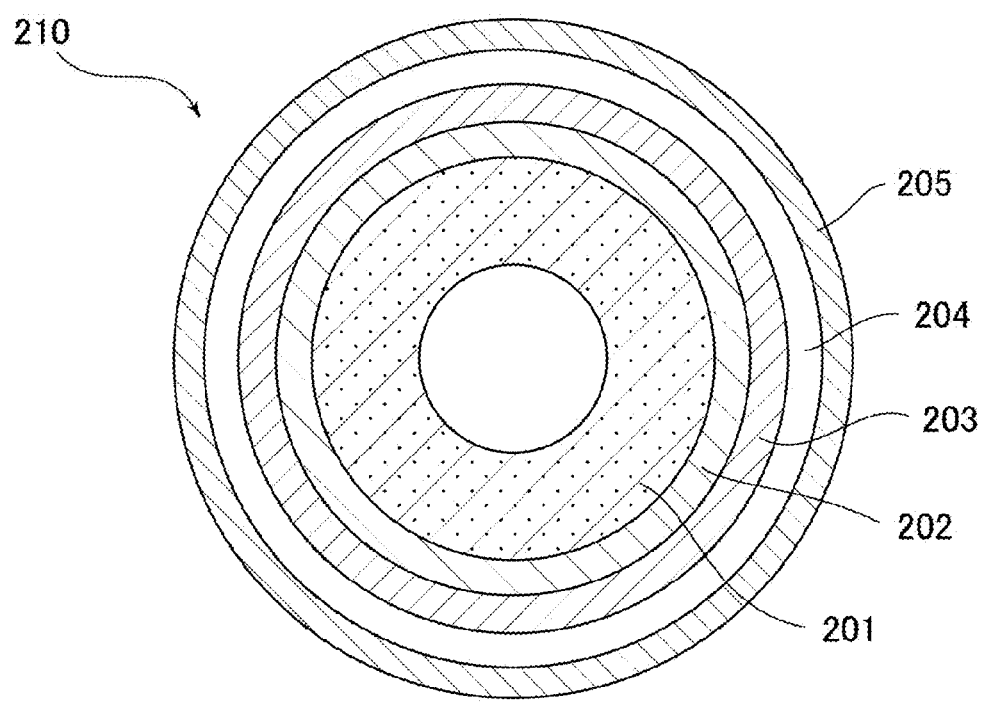
FIG. 1 is a schematic view showing one aspect of a cross section of a solid oxide fuel cell of the present invention.

A solid oxide fuel cell of the present invention includes an inner electrode, a solid electrolyte, and an outer electrode sequentially laminated on the surface of a porous support. The fuel cell of the present invention is not limited to have particular shapes. The fuel cell may have for Example a cylindrical shape, a planar shape, a hollow planar shape in which multiple gas flow paths are formed, or other similar shapes. Since the porous support of the fuel cell of the present invention is an insulating support, horizontal stripe type cells are preferable in which multiple power generating elements are formed in series on one porous support. Here, the power generating elements mean a laminate having an inner electrode (fuel electrode or air electrode), a solid electrolyte, and an outer electrode (air electrode or fuel electrode), each of which is sequentially laminated.

In the fuel cell of the present invention, the porous support contains forsterite, and further contains a strontium element (Sr). The Sr concentration in the porous support is 0.02 mass % to 1 mass % both inclusive, preferably 0.02 mass % to 0.7 mass % both inclusive, further preferably 0.1 mass % to 0.7 mass % both inclusive, in terms of the oxide SrO based on the mass of the forsterite. The porous support is a sintered compact containing crystalline and/or amorphous MgO, crystalline and/or amorphous $SiO_2$, and other glassy materials and impurities in addition to forsterite ($Mg_2SiO_4$) crystals and the strontium element.

In the fuel cell of the present invention, the porous support preferably contains a magnesium element (Mg) in terms of MgO and a silicon element (Si) in terms of $SiO_2$ in total of 90 mass %, preferably 95 mass %, more preferably 98 mass % or more, wherein the elements contained in the porous support are converted to oxides. In the fuel cell of the present invention, it is more preferable that the porous support have a sum of peak tops of crystal components other than forsterite crystal of 5 or less, wherein the peak top of the forsterite crystal obtained by X-ray diffraction is 100.

Herein, the strontium element concentration can be measured, for example, using an X-ray fluorescence spectrometer (XRF). The XRF measurement sample can be prepared as follows. Specifically, the laminated surface of the fuel cell is mechanically striped, and the surface of the exposed porous support is mechanically ground up to obtain the sample of XRF. The sample is quantified by XRF using a one point calibration curve.

Preferably, the porous support consists essentially of forsterite (i.e., mainly formed from forsterite). Further, the porous support has a calcium element concentration of 0.2 mass % or less, preferably 0.1 mass % or less, more preferably 0.06 mass % or less, in terms of CaO preferably in the surface region at the power generating elements side, and does not necessarily have to contain a Ca element. Herein, the "surface region" means a region that covers a depth of approximately 100 µm from the surface. The calcium element concentration in such a surface region can be measured, for example, by XRF. The XRF measurement sample is prepared as follows. Specifically, the laminated surface of the fuel cell is mechanically striped, and the surface of the exposed porous support is mechanically ground up to approximately 100 µm to obtain the sample of XRF. Moreover, when the sample is quantified by XRF, JCRM R 901 talc powder which is a certified reference material by the Ceramic Society of Japan is used to create a one point calibration curve for the XRF.

The calcium element concentration distribution in the porous support may be uniform, or may have a gradation toward the surface of the porous support at the power generating elements side. Alternatively, the porous support may be a laminate having at least two layers, each having different calcium element concentrations. When the porous support has a gradation of calcium element concentration distribution toward the surface of the porous support at the power generating elements side, or when the porous support is a laminate having two or more layers, the calcium element concentration in regions other than the surface region at the power generating elements side may exceed 0.2 mass %. The porous support is obtained by preparing a compact having a calcium element concentration within a predetermined range, and then firing the compact. The porous support is preferably obtained by preparing a compact by mixing a raw material containing calcium element, the concentration of which is higher than the above-described range, and forsterite with a raw material containing calcium element, the concentration of which is lower than the above-described range, and forsterite so that the compact can have a calcium element concentration within the predetermined range, and then firing the compact.

In the fuel cell of the present invention, the inner electrode may be a fuel electrode or an air electrode. In the fuel cell (cylindrical cell, hollow planar cell, or the like) including the gas flow paths within the porous support, the inner electrode is preferably a fuel electrode. When the inner electrode is a fuel electrode, the outer electrode is an air electrode.

The fuel electrode may be made of NiO/zirconium-containing oxide, NiO/cerium-containing oxide, or the like. Here, the NiO/zirconium-containing oxide means one obtained by uniformly mixing NiO with a zirconium-containing oxide in a predetermined ratio. The NiO/cerium-containing oxide means one obtained by uniformly mixing NiO with a cerium-containing oxide in a predetermined ratio. The zirconium-containing oxide in the NiO/zirconium-containing oxide includes zirconium-containing oxides doped with one or more of CaO, $Y_2O_3$, and $Sc_2O_3$, and the like. The cerium-containing oxide in the NiO/cerium-containing oxide includes ones represented by the general formula $Ce_{1-y}Ln_yO_2$, where Ln is any one of or a combination of two or more of La, Pr, Nd, Sm, Eu, Gd, Tb, Dy, Ho, Er, Tm, Yb, Lu, Sc, and Y, $0.05 \leq y \leq 0.50$. Note that since NiO is reduced under a fuel atmosphere and turned into Ni, the mixture becomes Ni/zirconium-containing oxide or Ni/cerium-containing oxide. The fuel electrode may be composed of a single layer or multiple layers. In the case where the fuel electrode as the inner electrode includes multiple layers, Ni/YSZ (yttria-stabilized zirconia) is used for a layer at the support side while Ni/GDC ($Gd_2O_3$—$CeO_2$) (=fuel electrode catalyst layer) is used for a layer at the solid electrolyte side.

The air electrode may be made of a lanthanum-cobalt-based oxide such as $La_{1-x}Sr_xCoO_3$ (where x=0.1 to 0.3) or $LaCo_{1-x}Ni_xO_3$ (where x=0.1 to 0.6), a lanthanum-ferrite-based oxide ($La_{1-m}Sr_mCo_{1-n}Fe_nO_3$ (where 0.05<m<0.50, 0<n<1)) which is a solid solution of (La, Sr)$FeO_3$ and (La, Sr)$CoO_3$, or the like. The air electrode may be composed of a single layer or multiple layers. In the case where the air electrode as the outer electrode includes multiple layers, $La_{0.6}Sr_{0.4}Co_{0.2}Fe_{0.8}O_3$ (=air electrode catalyst layer) is used for a layer at the solid electrolyte side, and $La_{0.6}Sr_{0.4}Co_{0.8}Fe_{0.2}O_3$ (=air electrode) is used for the outermost layer.

In the fuel cell of the present invention, the solid electrolyte may be made of lanthanum-gallate-based oxide, stabilized zirconia doped with one or more of Y, Ca, and Sc. The solid electrolyte preferably includes lanthanum-gallate-based oxide doped with Sr and Mg, more preferably lanthanum-gallate-based oxide (LSGM) represented by the general formula $La_{1-a}Sr_aGa_{1-b-c}Mg_bCo_cO_3$, where $0.05 \leq a \leq 0.3$, $0<b<0.3$, and $0 \leq c \leq 0.15$. A layer of cerium-based oxide as a reaction prevention layer may be disposed on the fuel electrode side of the solid electrolyte in which ceria is doped with La ($Ce_{1-x}La_xO_2$ (where 0.3<x<0.5)). The reaction prevention layer is preferably made of $Ce_{0.6}La_{0.4}O_2$. The solid electrolyte may be composed of a single layer or multiple layers. In the case where the solid electrolyte includes multiple layers, a reaction prevention layer made of compounds such as $Ce_{0.6}La_{0.4}O_2$ is used between the fuel electrode and a layer of the solid electrolyte made of LSGM.

FIG. 1 is a schematic view showing one aspect of a cross section of the solid oxide fuel cell of the present invention, and shows a type in which the inner electrode is a fuel electrode. A solid oxide fuel cell 210 of the present invention includes, for example, a porous support 201, a (first/second) fuel electrode 202, a (first/second) solid electrolyte 203, a (first/second) air electrode 204, and a current collecting layer 205. In the solid oxide fuel cell of the present invention, the thickness of each layer is preferably: 0.5 to 2 mm for the porous support, 10 to 200 μm for the fuel electrode, 0 to 30 μm for the fuel electrode catalyst layer, 0 to 20 μm for the reaction prevention layer, 5 to 60 μm for the solid electrolyte, 0 to 30 μm for the air electrode catalyst layer, and 10 to 200 μm for the air electrode. Here, (first/second) means "being a single layer or two layers, and in the case of two layers, having a first layer and a second layer."

A method for producing the solid oxide fuel cell of the present invention is not particularly limited. The solid oxide fuel cell of the present invention can be produced, for example, as follows.

A solvent (such as water or alcohol) is added to a raw-material powder containing forsterite to prepare a green body. In this event, an optional component such as a dispersant, a binder, an anti-foaming agent, or a pore forming agent may be added. The green body thus prepared is molded, dried, and then pre-fired (800° C. or higher but lower than 1100° C.) to obtain a porous support. For molding the green body, a sheet molding method, a press molding method, an extrusion method, or the like is employed. An extrusion method is preferably employed for molding a porous support in which gas flow passage are formed. When the porous support forming multiple layers is molded, in addition to a method of "multilayer extrusion" in which the multiple layers are integrally extruded, a method in which the upper layer is formed by coating or printing can also be employed. The coating method includes a slurry coating method in which a raw material slurry is applied, a tape casting method, a doctor blade casting method, a transferring method, and the like. The printing method includes a screen printing method, an inkjet method, and the like.

The inner electrode, the solid electrolyte, and the outer electrode can be obtained as follows. Specifically, to each raw-material powder, a solvent (such as water or alcohol) and a molding additive such as a dispersant or a binder are added to prepare a slurry. The slurry is applied, dried, and then fired (1100° C. or higher but lower than 1400° C.). The slurry can be applied by the same method that can be employed for the coating with the upper layer of the porous support including multiple layers. The firing may be performed every time each layer of the electrodes and solid electrolyte is formed, but "co-firing" in which the multiple layers are fired at once is preferably performed. In addition, in order not to degrade the solid electrolyte by the diffusion of the dopant or the like, the firing is preferably performed in an oxidizing atmosphere. More preferably, a gas mixture of air and oxygen is used, and the firing is performed in such an atmosphere that the oxygen concentration is 20 mass % to 30 mass % both inclusive. When a fuel electrode is used as the inner electrode and an air electrode is used as the outer electrode, it is preferable that the fuel electrode and the solid electrolyte be co-fired, and then the air electrode be formed and fired at a temperature lower than the co-firing.

Figure 2:
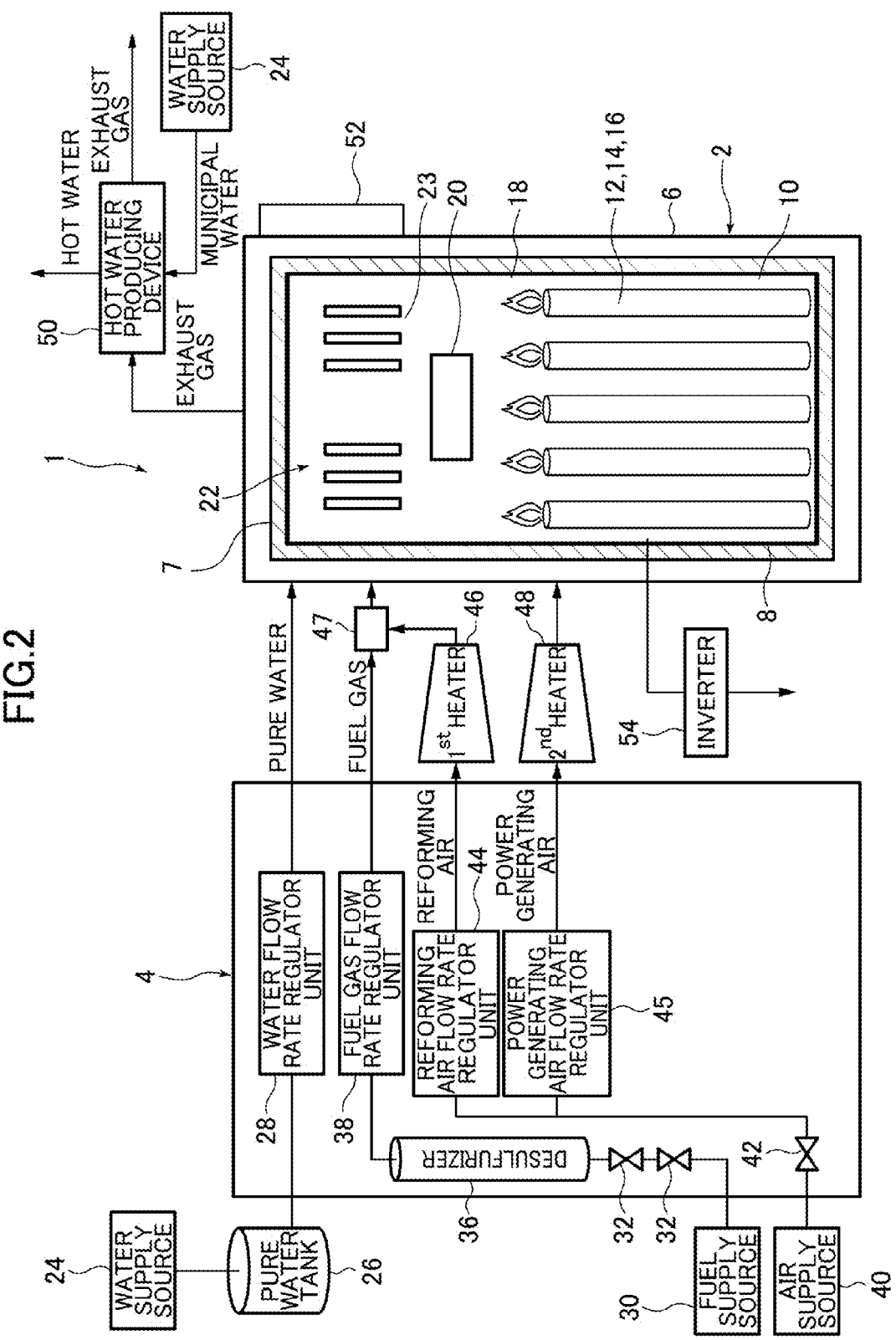
FIG. 2 is an overview diagram showing a solid oxide fuel cell system.

A solid oxide fuel cell system using the solid oxide fuel cell of the present invention is not limited to have particular structures. The production thereof, other materials, and the like may be publicly-known ones. FIG. 2 is an overview diagram showing a solid oxide fuel cell system according to one embodiment of the present invention. As shown in FIG. 2, a solid oxide fuel cell system 1 includes a fuel cell module 2 and an auxiliary unit 4.

The fuel cell module 2 includes a housing 6. The housing 6 with an insulating material 7 has a sealed space 8 therein. Note that it is acceptable not to provide the insulating material. A fuel cell assembly 12 for carrying out the power generating reaction using fuel gas and oxidizer (air) is disposed in a power generating chamber 10, which is the lower part of this sealed space 8. This fuel cell assembly 12 is furnished with ten fuel cell stacks 14 (see FIG. 4); the fuel cell stack 14 includes 16 fuel cell units 16 (see FIG. 5). Thus, the fuel cell assembly 12 has 160 fuel cell units 16, all of which are serially connected.

In the sealed space 8 of the fuel cell module 2, a combustion chamber 18 is formed above the aforementioned power generating chamber 10. In the combustion chamber 18, residual fuel gas and residual oxidizer (air) not used in the power generating reaction are combusted to produce exhaust gas. Above the combustion chamber 18, a reformer 20 for reforming fuel gas is disposed. The reformer 20 is heated by the heat of combustion of the residual gas to a temperature at which reforming reaction can take place. Above the reformer 20, an air heat exchanger 22 is disposed, which receives the heat of the reformer 20 to heat air and which reduces a decrease in the temperature of the reformer 20.

Next, the auxiliary unit 4 includes a pure water tank 26 for holding water from a water supply source 24 such as waterworks and filtering the water into pure water, and a water flow rate regulator 28 for regulating the flow rate of water supplied from the reservoir tank. The auxiliary unit 4 further includes a gas shutoff valve 32 for shutting off fuel gas such as municipal gas supplied from a fuel supply source 30, a desulfurizer 36 for desulfurizing the fuel gas, and a fuel gas flow rate regulator 38 for regulating the flow rate of the fuel gas. Furthermore, the auxiliary unit 4 includes an electromagnetic valve 42 for shutting off air as an oxidant supplied from an air supply source 40, a reforming air flow rate regulator 44 and a power generating air flow rate regulator 45 for regulating the flow rate of air, a first heater 46 for heating reforming air supplied to the reformer 20, and a second heater 48 for heating power generating air supplied to the power generating chamber. The first and second heaters 46 and 48 are provided to efficiently raise temperature at startup, but may be omitted.

Next, the fuel cell module 2 is connected to a hot-water producing device 50. The hot-water producing device 50 is supplied with exhaust gas. The hot-water producing device 50 is supplied with municipal water from the water supply source 24. This municipal water is turned into hot water by the heat of the exhaust gas and supplied to a hot water reservoir tank in an unillustrated external water heater. Moreover, the fuel cell module 2 is provided with a control box 52 for controlling the supply flow rate of the fuel gas and the like. Further, the fuel cell module 2 is connected to an inverter 54. The inverter 54 serves as an electrical power extraction unit (electrical power conversion unit) for supplying electrical power generated by the fuel cell module to the outside.

Figure 3:
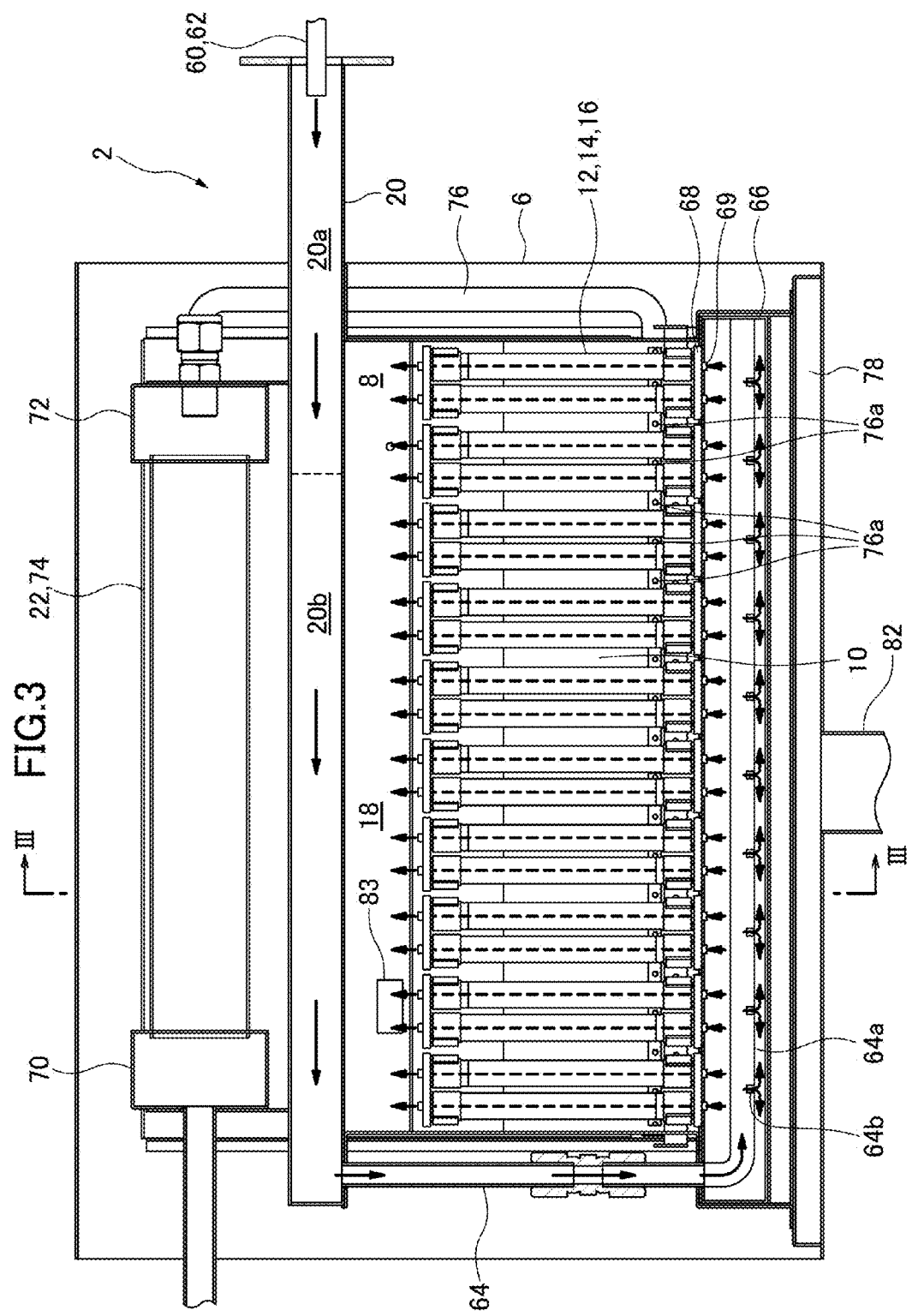
FIG. 3 is a side elevation cross section showing a fuel cell module in the solid oxide fuel cell system.
Figure 6:
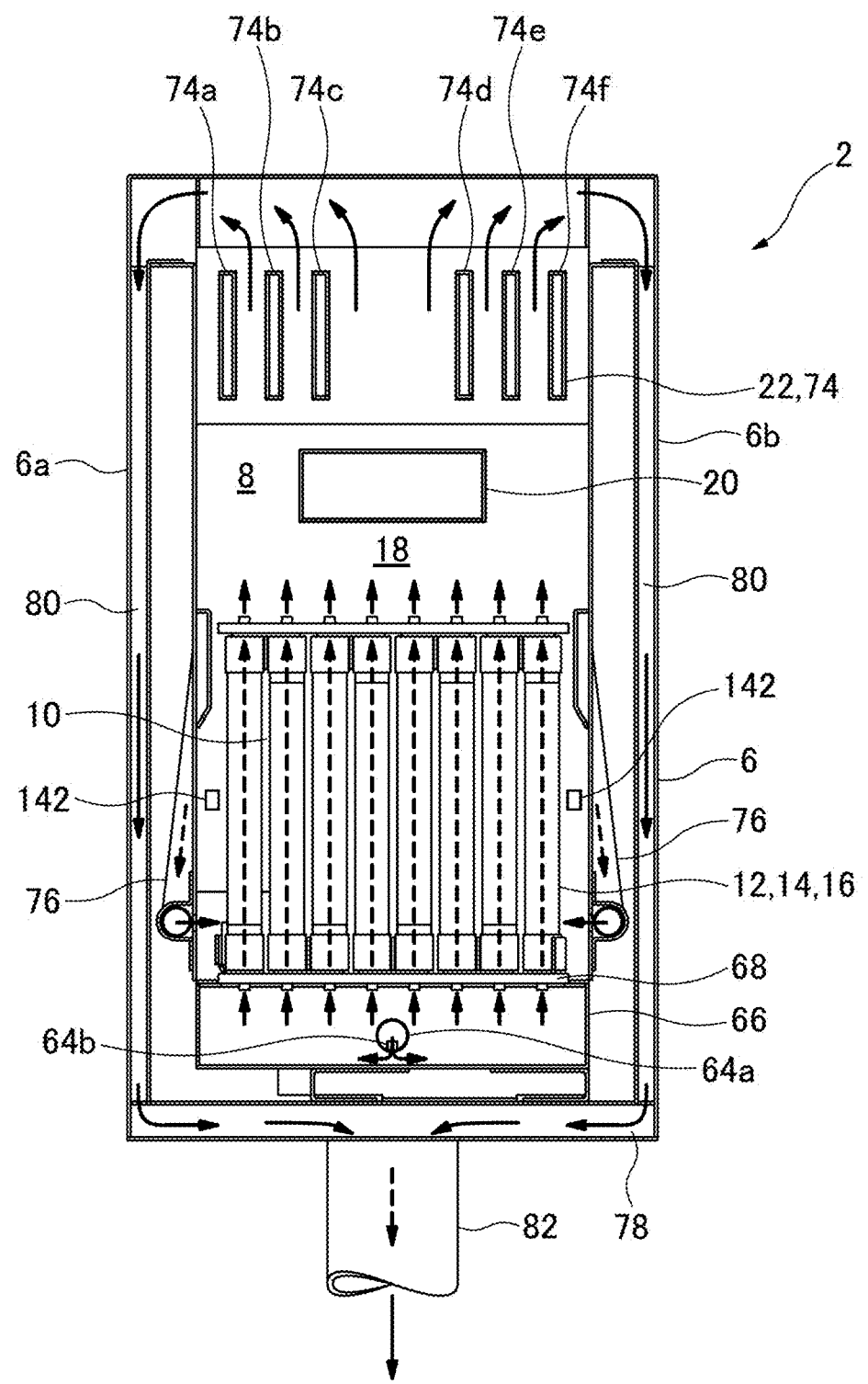
FIG. 6 is a cross section taken along the line III-III in FIG. 3.
Figure 7:
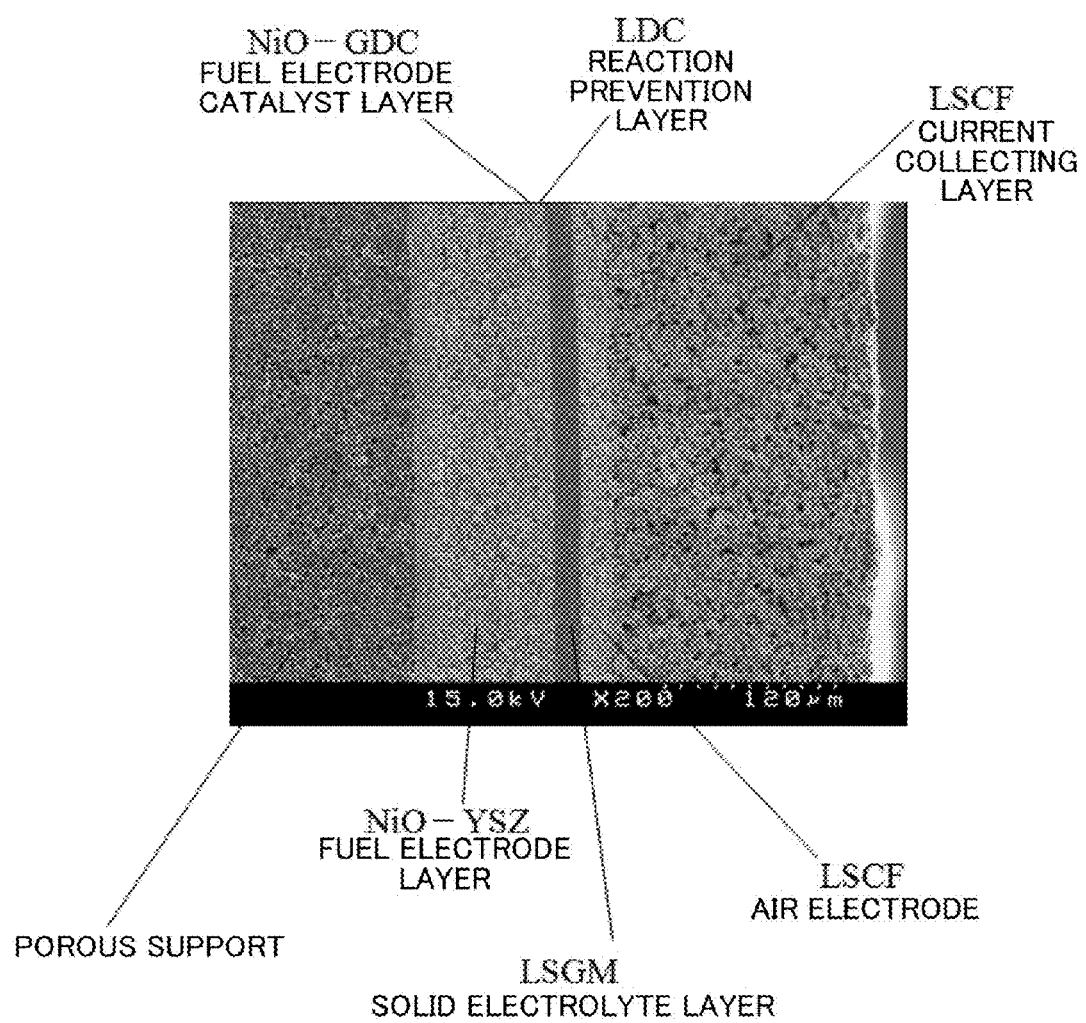
FIG. 7 is an electron microphotograph (magnification 200×) of a fractured surface of a solid oxide fuel cell in Example 1.
Figure 8:
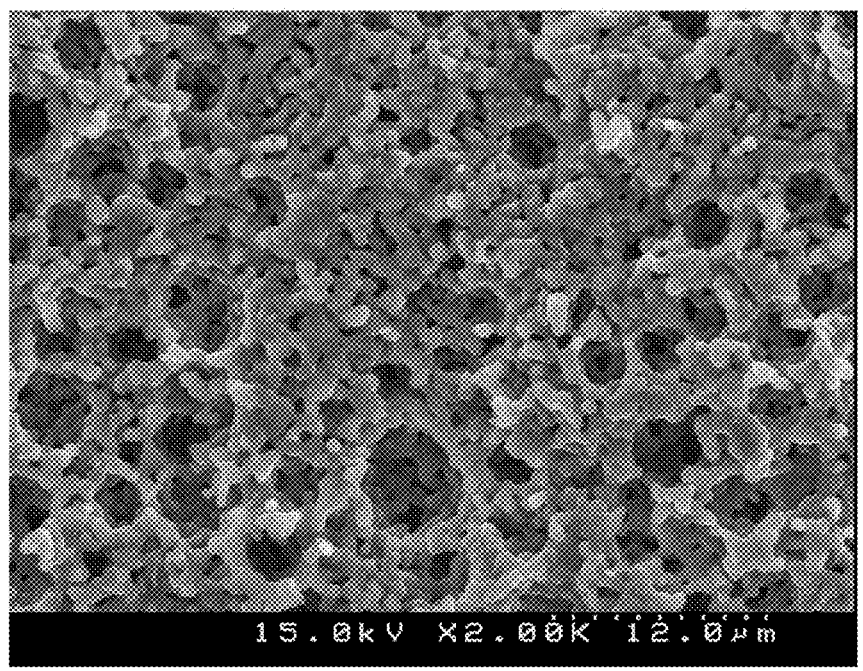
FIG. 8 is an electron microphotograph (magnification 2000×) of the fractured surface of the solid oxide fuel cell in Example 1.
Figure 9:
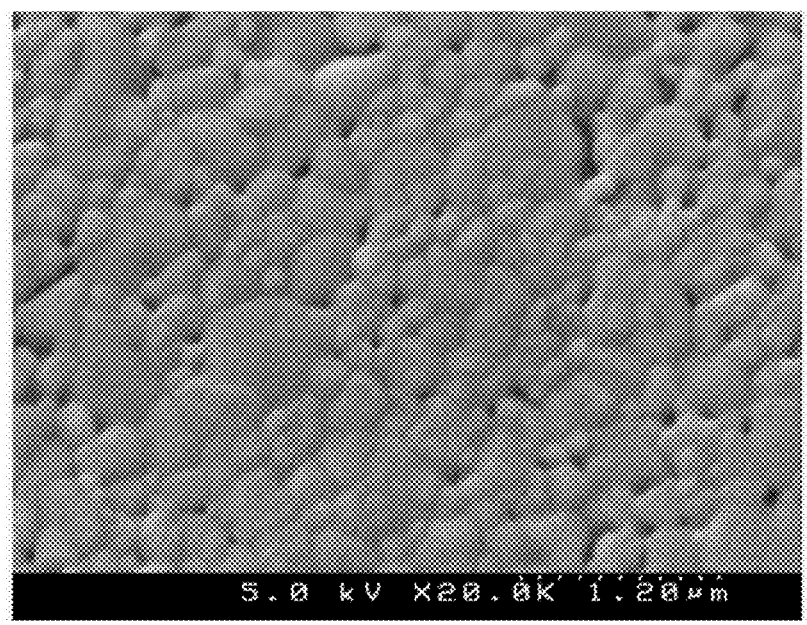
FIG. 9 is an electron microphotograph of a porous support of Reference Example 1.
Figure 10:
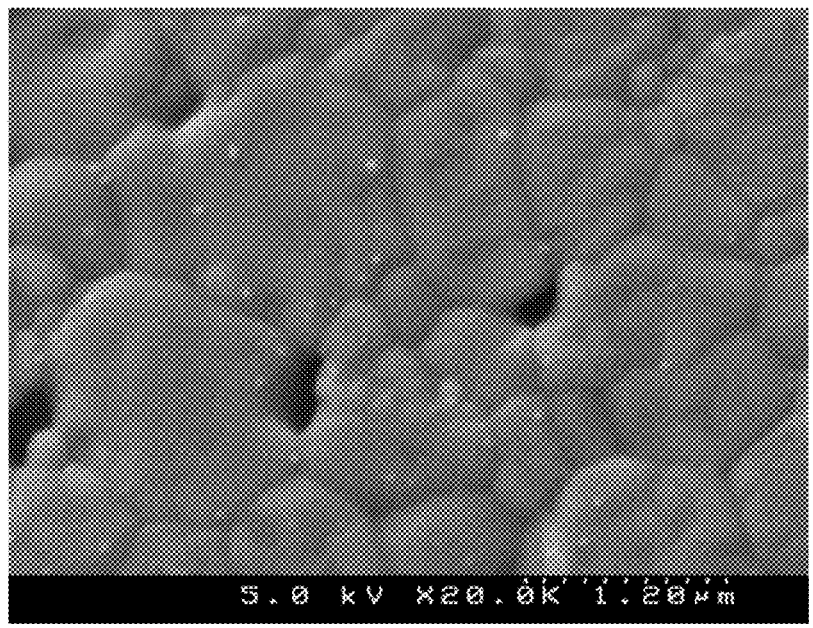
FIG. 10 is an electron microphotograph of a porous support of Reference Example 2.
Figure 11:
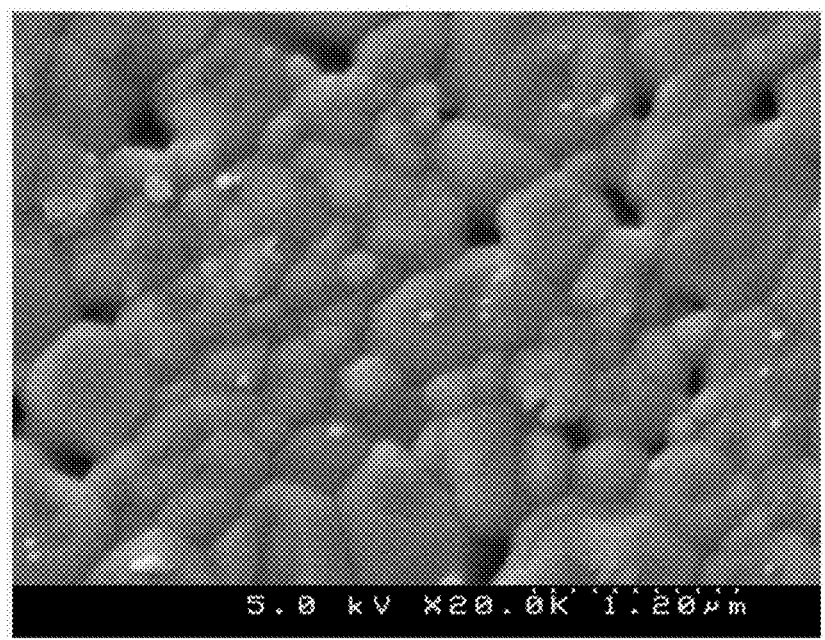
FIG. 11 is an electron microphotograph of a porous support of Reference Example 3.

Next, with reference to FIGS. 3 and 6, a description will be made of the internal structure of the fuel cell module of the solid oxide fuel cell system. FIG. 3 is a side elevation cross section showing the fuel cell module of the solid oxide fuel cell system. FIG. 6 is a cross section taken along line in FIG. 3. As shown in FIGS. 3 and 6, the fuel cell assembly 12, the reformer 20, and the air heat exchanger 22 are arranged in sequence starting from the bottom in the sealed space 8 within the housing 6 of the fuel cell module 2 as described above.

A pure water guide pipe 60 for introducing pure water and a reformed gas guide pipe 62 for introducing fuel gas to be reformed and reforming air are attached to an upstream end of the reformer 20. Within the reformer 20, a vaporizing section 20a and a reforming section 20b are formed in sequence starting from the upstream side. The reforming section 20b is filled with a reforming catalyst. The fuel gas and air introduced into the reformer 20 and blended with water vapor are reformed by the reforming catalyst filled into the reformer 20.

A fuel gas supply pipe 64 is connected to a downstream end of the reformer 20. The fuel gas supply pipe 64 extends downward and further extends horizontally within a manifold 66 formed under the fuel cell assembly 12. Multiple fuel supply holes 64b are formed in a bottom surface of a horizontal portion 64a of the fuel gas supply pipe 64. Reformed fuel gas is supplied into the manifold 66 from the fuel supply holes 64b.

A lower support plate 68 having through holes for supporting the above-described fuel cell stacks 14 is attached to the top of the manifold 66, and fuel gas in the manifold 66 is supplied into the fuel cell unit 16.

Next, the air heat exchanger 22 is provided over the reformer 20. The air heat exchanger 22 includes an air concentration chamber 70 upstream of the exchanger and two air distribution chambers 72 downstream of the exchanger. The air concentration chamber 70 and the air distribution chambers 72 are connected through six air flow conduits 74. Here, as shown in FIG. 6, air in the air concentration chamber 70 flows from the two sets of the air flow conduits 74, each set has three air flow conduits 74 (74a, 74b, 74c; 74d, 74e, 74f), into the respective air distribution chambers 72.

Air flowing in the six air flow conduits 74 of the air heat exchanger 22 is pre-heated by rising combustion exhaust gas from the combustion chamber 18. An air guide pipe 76 is connected to each of the air distribution chambers 72. The air guide pipe 76 extends downward. The lower end of the air guide pipe 76 communicates with a lower space in the power generating chamber 10 to introduce pre-heated air into the power generating chamber 10.

Next, an exhaust gas chamber 78 is formed below the manifold 66. As shown in FIG. 6, exhaust gas conduits 80 extending in the vertical direction are formed on the insides of a front surface 6a and a rear surface 6b which form the faces in the longitudinal direction of the housing 6. Top ends of the exhaust gas conduits 80 communicate with a space in which the air heat exchanger 22 is disposed, and bottom ends thereof communicate with the exhaust gas chamber 78. An exhaust gas discharge pipe 82 is connected to nearly a central portion of a bottom surface of the exhaust gas chamber 78. A downstream end of the exhaust gas discharge pipe 82 is connected to the aforementioned hot-water producing device 50 shown in FIG. 2. As shown in FIG. 3, an ignition device 83 for starting the combustion of fuel gas and air is provided in the combustion chamber 18.

Figure 4:
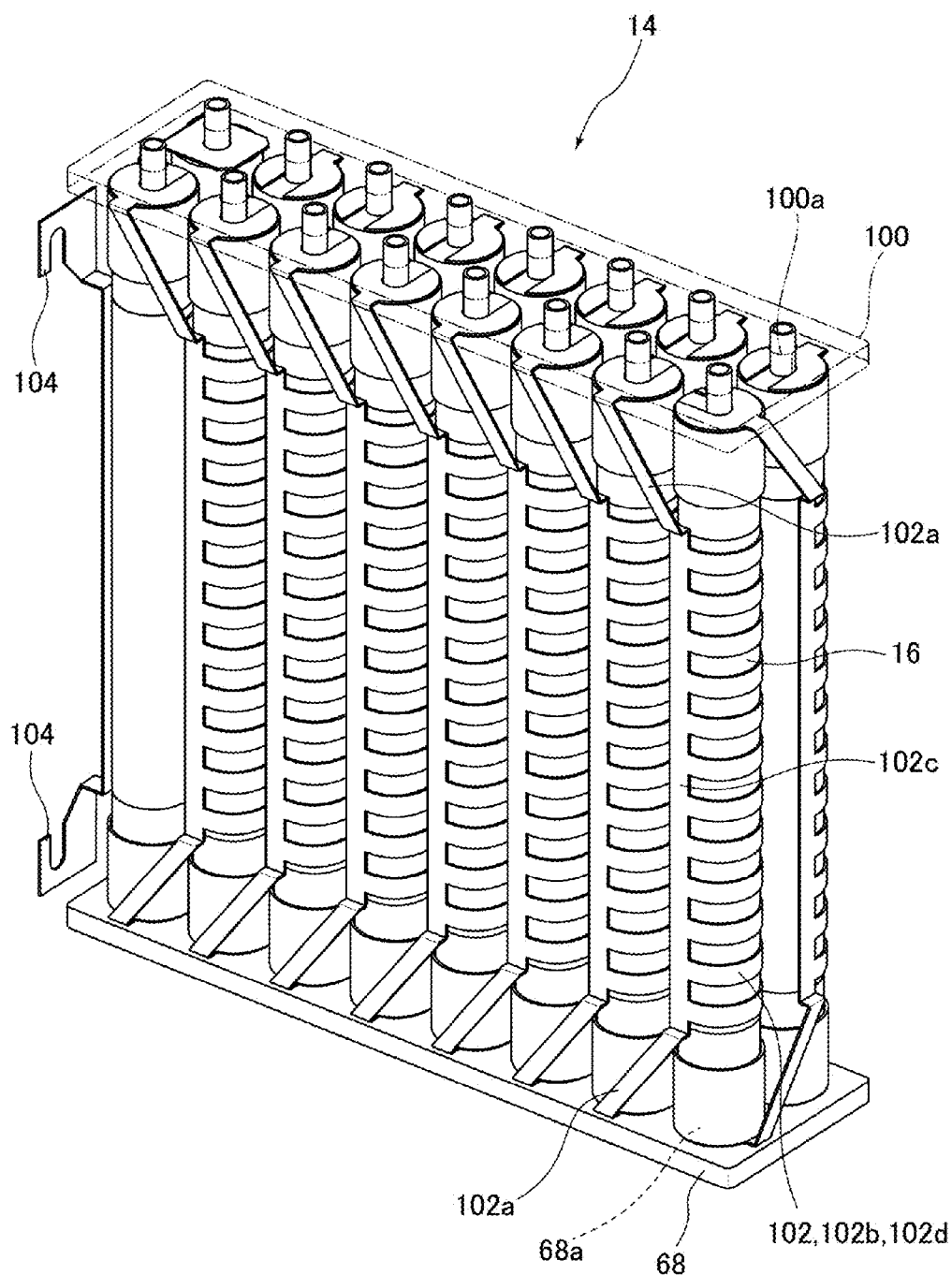
FIG. 4 is a perspective view showing a fuel cell stack in the solid oxide fuel cell system.

Next, referring to FIG. 4, the fuel cell stack 14 will be described. FIG. 4 is a perspective view showing the fuel cell stack in the solid oxide fuel cell system. As shown in FIG. 4, the fuel cell stack 14 is furnished with 16 fuel cell units 16; the top and bottom ends of these fuel cell units 16 are respectively supported by the lower support plate 68 and an upper support plate 100, which are made of ceramic. Through holes 68a and 100a, through which inner electrode terminals 86 can penetrate, are provided on the lower support plate 68 and the upper support plate 100.

In addition, a current collector 102 and an external terminal 104 are attached to the fuel cell unit 16. The current collector 102 is integrally formed by a fuel electrode connecting portion 102a, which is electrically connected to the inner electrode terminal 86 attached to an inner electrode 90 serving as the fuel electrode, and by an air electrode connecting portion 102b, which is electrically connected to the entire external perimeter of an outer electrode 92 serving as the air electrode. The air electrode connecting portion 102b is formed of a vertical portion 102e extending in the vertical direction along the surface of the outer electrode 92, and multiple horizontal portions 102d extending in the horizontal direction from the vertical portion 102c along the surface of the outer electrode 92. The fuel electrode connecting portion 102a extends linearly in an upward or downward diagonal direction from the vertical portion 102c of the air electrode connecting portion 102b toward the inner electrode terminals 86 positioned in the upper and lower directions on the fuel cell unit 16.

Furthermore, the inner electrode terminals 86 at the top and bottom ends of the two fuel cell units 16 positioned at the end of the fuel cell stack 14 (at the front and back sides on the left edge in FIG. 4) are respectively connected to the external terminals 104. These external terminals 104 are connected to other external terminals 104 (not shown) of the fuel cell units 16 at the ends of the adjacent fuel cell stack 14, and as described above, all of the 160 fuel cell units 16 are connected in series.

Figure 5:
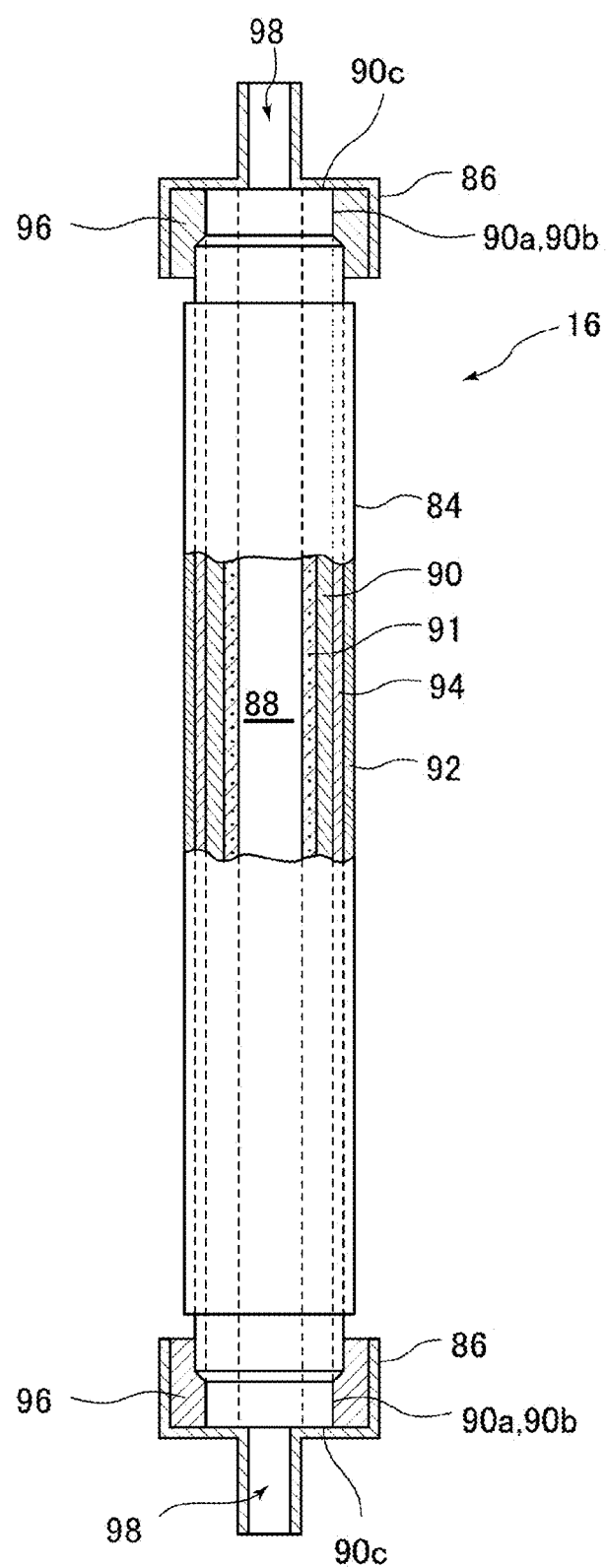
FIG. 5 is a partial cross section showing a fuel cell unit in the solid oxide fuel cell system.

Next, referring to FIG. 5, the fuel cell unit 16 will be described. FIG. 5 is a partial cross section showing the fuel cell unit in the solid oxide fuel cell system. As shown in FIG. 5, the fuel cell unit 16 includes a fuel cell 84 and the inner electrode terminals 86 respectively connected to top and bottom ends of the fuel cell 84. The fuel cell 84 is a tubular structure extending in the vertical direction, and includes the inner electrode 90 on a cylindrical porous support 91 defining a fuel gas flow path 88, the outer electrode 92, and a solid electrolyte 94 between the inner electrode 90 and the outer electrode 92.

Since the inner electrode terminals 86 attached to the top and bottom ends of the fuel cell 84 have the same structure, the inner electrode terminal 86 attached to the top end will be specifically described here. A top portion 90*a* of the inner electrode 90 includes an outside perimeter surface 90*b* and a top end surface 90*c* which are exposed to the solid electrolyte 94 and the outer electrode 92. The inner electrode terminal 86 is connected to the outside perimeter surface 90*b* of the inner electrode 90 through a conductive seal material 96, and connected directly to the top end surface 90*c* of the inner electrode 90 and thereby electrically connected to the inner electrode 90. A fuel gas flow path 98 communicating with the fuel gas flow path 88 of the inner electrode 90 is formed in a center portion of the inner electrode terminal 86. The fuel cell of the present invention is used as the fuel cell 84.

Next, a startup mode of the fuel cell system FCS will be described. First, the reforming air flow rate regulator 44, the electromagnetic valve 42, and a mixer 47 are controlled so as to increase the amount of reforming air, and the air is supplied to the reformer 20. Moreover, the power generating chamber 10 is supplied with power generating air through the air guide pipe 76 by controlling the power generating air flow rate regulator 45 and the electromagnetic valve 42. Furthermore, the fuel gas flow rate regulator 38 and the mixer 47 are controlled so as to increase the supply of fuel gas, and the gas to be reformed is supplied to the reformer 20. The gas to be reformed and the reforming air transferred to the reformer 20 are then transferred into the fuel cell units 16 from the individual through holes 69 through the reformer 20, the fuel gas supply pipe 64, and the gas manifold 66. The gas to be reformed and the reforming air transferred into each fuel cell unit 16 pass through the fuel gas flow path 88 from the fuel gas flow path 98 formed at the bottom end of the fuel cell unit 16, and flow out of the fuel gas flow path 98 formed at the top end of the fuel cell unit 16. After that, ignition is brought about by the ignition device 83, and combustion operation is performed on the gas to be reformed, which flows out of a top end of the fuel gas flow path 98. Thus, the gas to be reformed is combusted in the combustion chamber 18, and the partial oxidation reforming reaction (PDX) takes place.

Then, an auto-thermal reforming reaction (ATR) takes place, provided that the temperature of the reformer 20 reaches approximately 600° C. or higher, and that the temperature of the fuel cell assembly 12 exceeds approximately 250° C. In this event, a premixed gas of gas to be reformed, reforming air and steam is supplied to the reformer 20 by the water flow rate regulator 28, the fuel gas flow rate regulator 38, and the reforming air flow rate regulator 44. Subsequently, a steam reforming reaction (SR) takes place, provided that the temperature of the reformer 20 reaches 650° C. or higher, and that the temperature of the fuel cell assembly 12 exceeds approximately 600° C.

By the switching of the reforming steps in accordance with the proceeding of the combustion step after the ignition as described above, the temperature in the power generating chamber 10 gradually rises. When the temperature of the power generating chamber 10 reaches a predetermined power generating temperature below the rated temperature (approximately 700° C.) at which the fuel cell module 2 can be stably operated, the electrical circuit including the fuel cell module 2 is closed. Thus, the fuel cell module 2 starts electrical generation, and current flows in the circuit, so that the electrical power can be supplied to the outside.

EXAMPLES

The present invention will be described in more details based on the following Examples. Note that the present invention is not limited to these Examples.

Example 1

Preparation of Green Body for Porous Support

A forsterite powder (an average particle diameter of 2.0 μm) having a Mg/Si molar ratio of 1.98 was synthesized to have 0.008 mass % sulfur S, 0.02 mass % aluminium Al, and 0.02 mass % CaO. After 99.7 parts by mass of the forsterite powder and 0.3 parts by mass of a high purity strontium carbonate powder (purity of 99.4% or higher) were wet-ground and mixed using a ball mill, the resultant was dried by spray-drying to prepare a mixture powder. Then, 100 parts by mass of the mixture powder was mixed with 8 parts by mass of a binder (methyl cellulose-based water-soluble polymer) and 20 parts by mass of a pore forming agent (acrylic resin particles having an average particle diameter of 5 μm) using a high-speed mixer. Further, 20 parts by mass of a solvent (water) was added thereto and mixed together using a high-speed mixer. The mixture thus obtained was kneaded with a kneader and deaerated with a vacuum kneader. Thus, a green body for extrusion was prepared. Here, the average particle diameter was measured according to JIS R 1629, and expressed in a mass median diameter (D50) (the same applies hereinafter).

(Preparation of Slurry for Fuel Electrode)

A NiO powder and a 10YSZ (10 mol % $Y_2O_3$-90 mol % $ZrO_2$) powder were wet-mixed in a mass ratio of 65:35 to prepare a dry powder. The average particle diameter was adjusted to be 0.7 μm. Then, 40 parts by mass of the powder was mixed with 100 parts by mass of a solvent (ethanol), 2 parts by mass of a binder (ethyl cellulose), and 1 part by mass of a dispersant (nonionic surfactant). After that, the resultant mixture was fully stirred to prepare a slurry. Note that "10 mol % $Y_2O_3$-90 mol % $ZrO_2$" means that the concentrations of a Y atom and a Zr atom are respectively 10 mol % and 90 mol % based on a total amount of the Y atom and the Zr atom.

(Preparation of Slurry for Fuel Electrode Catalyst Layer)

A mixture of NiO and GDC10 (10 mol % $Gd^2O_3$-90 mol % $CeO_2$) was prepared by co-precipitation and then heat treated. Thus, a fuel electrode catalyst layer powder was obtained. The mixing ratio of NiO and GDC 10 was 50/50 by mass. The average particle diameter was adjusted to be 0.5 μm. Then, 20 parts by mass of the powder was mixed with 100 parts by mass of a solvent (ethanol), 2 parts by mass of a binder (ethyl cellulose), and 1 part by mass of a dispersant (nonionic surfactant). After that, the resultant mixture was fully stirred to prepare a slurry. Note that "10 mol % $Gd_2O_3$-90 mol % $CeO_2$" means that the concentrations of a Gd atom and a Ce atom are respectively 10 mol % and 90 mol % based on a total amount of the Gd atom and the Ce atom.

(Preparation of Slurry for Reaction Prevention Layer)

The material used for a reaction prevention layer was 10 parts by mass of a powder of the aforementioned cerium-based oxide (LDC40, that is, 40 mol % $La_2O_3$-60 mol % $CeO_2$). The powder was mixed with 0.04 parts by mass of a $Ga_2O_3$ powder as a sintering additive, 100 parts by mass of a solvent (ethanol), 2 parts by mass of a binder (ethyl cellulose), and 1 part by mass of a dispersant (nonionic surfactant). After that, the resultant mixture was fully stirred to prepare a slurry. Note that "40 mol % $La_2O_3$-60 mol % $CeO_2$" means that the concentrations of a La atom and a Ce atom are respectively 40 mol % and 60 mol % based on a total amount of the La atom and the Ce atom.

(Preparation of Slurry for Solid Electrolyte)

The material used for a solid electrolyte was an LSGM powder having a composition of $La_{0.9}Sr_{0.1}Ga_{0.8}Mg_{0.2}O_3$. Then, 40 parts by mass of the LSGM powder was mixed with 100 parts by mass of a solvent (ethanol), 2 parts by mass of a binder (ethyl cellulose), and 1 part by mass of a dispersant (nonionic surfactant). After that, the resultant mixture was fully stirred to prepare a slurry.

(Preparation of Slurry for Air Electrode)

The material used for an air electrode was a powder having a composition of $La_{0.6}Sr_{0.4}Co_{0.2}Fe_{0.8}O_3$. Then, 40 parts by mass of the powder was mixed with 100 parts by mass of a solvent (ethanol), 2 parts by mass of a binder (ethyl cellulose), and 1 part by mass of a dispersant (nonionic surfactant). After that, the resultant mixture was fully stirred to prepare a slurry.

(Preparation of Slurry for Current Collecting Layer)

The material used for a current collecting layer was a powder having a composition of $La_{0.6}Sr_{0.4}Co_{0.8}Fe_{0.2}O_3$. Then, 100 parts by mass of the powder was mixed with 100 parts by mass of a solvent (ethanol), 6 parts by mass of a binder (ethyl cellulose), and 2 parts by mass of a dispersant (nonionic surfactant). After that, the resultant mixture was fully stirred to prepare a slurry.

(Preparation of Solid Oxide Fuel Cell)

Using the green body and the slurries obtained as described above, a solid oxide fuel cell was prepared by the following method.

The green body for porous support was extruded to prepare a cylindrical compact. The compact was dried at room temperature, and then heat treated at 1050° C. for 2 hours to prepare a porous support. On the porous support, a fuel electrode, a fuel electrode catalyst layer, a reaction prevention layer, and a solid electrolyte were formed in that order by slurry coating. This layered assembly was co-fired at 1300° C. for 2 hours. Next, masking was performed on the cell so that the area of an air electrode may be 17.3 cm², and the air electrode and the current collecting layer were formed on the surface of the solid electrolyte and fired at 1100° C. for 2 hours. It should be noted that the porous support had an outside diameter of 10 mm and a thickness of 1 mm after co-firing. In the prepared solid oxide fuel cell, the fuel electrode had a thickness of 100 μm, the fuel electrode catalyst layer had a thickness of 10 μm, the reaction prevention layer had a thickness of 10 μm, the solid electrolyte had a thickness of 30 μm, and the air electrode had a thickness of 20 μm. In addition, the outside diameter of the porous support was measured using a micrometer at a portion where no film was formed. Each thickness was obtained by: cutting the cell after a power generation test on the system, observing the cross section with a SEM at any magnification from 30 to 2000, and then dividing by 2 the sum of the maximum value and the minimum value of the thickness. The cutting point was a central portion of the region where the air electrode was formed.

(Evaluation of Gas Permeability Coefficient of Support)

A sample 50 mm in length was placed in air at 20° C., and a differential pressure of 0.1 kgf/cm² ($N_2$ gas) was applied through the inner and outer surfaces of the sample. The amount of the $N_2$ gas having permeated through the sample was measured under the differential pressure to calculate the gas permeability coefficient. The unit of the gas permeability coefficient is m²/hr atm. The support having a larger value is preferable because the gas permeability is high.

(Evaluation of Strength of Support)

The strength was measured after the support was fired as in the case of the cell. The test piece was prepared by extrusion. The test method was in accordance with Testing method for flexural strength of fine ceramics at room temperature (JIS R 1601). The bending was performed by three-point bending, and a fixture test jig for three-point bending was used. For the measurement, AGS-H 1 kN manufactured by Shimadzu Corporation was used.

(Electron Microscope Observation)

The fractured surface of the solid oxide fuel cell was observed using a scanning electron microscope (S-4100 manufactured by Hitachi, Ltd.) at an accelerating voltage of 15 kV with secondary electron images at magnifications from 200 to 2000 to evaluate the shape of the structure of the solid electrolyte.

(Power Generation Test)

Using the obtained solid oxide fuel cell, power generation test was conducted. Current was collected on the fuel electrode side by pasting and baking a current collecting metal to an exposed portion of the fuel electrode with a silver paste. Current was collected on the air electrode side by pasting and baking a current collecting layer to an end of the air electrode with the silver paste.

The conditions for power generation were as follows.

Fuel gas: a gas mixture ($H_2$+3% $H_2O$) and $N_2$ (the mixing ratio was $H_2:N_2$=7:4 (vol:vol))

Fuel utilization: 75%

Oxidant gas: air

Operation temperature: 700° C.

Current density: 0.2 A/cm²

Under these conditions, the power generation test was conducted. The electromotive force: OCV (V) and the initial potential ($V_0$) after 0 hours of the operation as well as the potential ($V2_{000}$) after 2000 hours of the continuous operation were measured. The durability was expressed by a value obtained by dividing the potential after the 2000-hour continuous operation by the initial potential and multiplying the quotient by 100 ($V_{2000}$*100/$V_0$). Table 1 shows the result.

Examples 2 to 8 and Comparative Example 1

Solid oxide fuel cells were prepared in the same manner as in Example 1, except that concentrations of components had values shown in Table 1, and the power generation test was conducted. Table 1 shows the result.

TABLE 1

| | Sr (mass %) | S (mass %) | Ca (mass %) | Al (mass %) | Strength (MPa) | Gas permeability coefficient ($m^2/h \cdot atm$) | Power generation performance ($V_0$) | Durability ($V_{2000}$) |
|---|---|---|---|---|---|---|---|---|
| Example 1 | 0.2 | 0.008 | 0.02 | 0.02 | 95 | 2 | 0.75 V | 98.7 |
| Example 2 | 0.1 | 0.008 | 0.02 | 0.02 | 76 | 1.8 | 0.73 V | 97.5 |
| Example 3 | 0.3 | 0.008 | 0.02 | 0.02 | 80 | 2.5 | 0.73 V | 98 |
| Example 4 | 0.7 | 0.008 | 0.02 | 0.02 | 73 | 2.4 | 0.71 V | 97.3 |
| Example 5 | 0.2 | 0.008 | 0.04 | 0.01 | 104 | 1.9 | 0.74 V | 98.5 |
| Example 6 | 0.2 | 0.008 | 0.07 | 0.01 | 115 | 1.8 | 0.71 V | 96.7 |
| Example 7 | 0.2 | 0.008 | 0.20 | 0.01 | 132 | 1.7 | 0.68 V | 93.7 |
| Example 8 | 0.2 | 0.008 | 1.03 | 0.01 | 142 | 1.2 | 0.63 V | 91.7 |
| Comparative Example 1 | 0 | 0.008 | 0.02 | 0.02 | 35 | 0.6 | 0.63 V | 85 |

Reference Example 1

Preparation of Green Body for Porous Support

A forsterite powder (an average particle diameter of 2.0 μm) having a Mg/Si molar ratio of 1.98 was synthesized to have 0.008 mass % sulfur S, 0.02 mass % aluminium Al, and 0.02 mass % CaO. After 100 parts by mass of the forsterite powder was wet-ground with a ball mill, the resultant was dried by spray-drying to prepare a powder. Then, 100 parts by mass of the powder was mixed with 8 parts by mass of a binder (methyl cellulose-based water-soluble polymer) using a high-speed mixer. Further, 20 parts by mass of a solvent (water) was added thereto and mixed together using a high-speed mixer. The mixture thus obtained was kneaded with a kneader and deaerated with a vacuum kneader. Thus, a green body for extrusion was prepared. Here, the average particle diameter was measured according to JIS R 1629, and expressed in a mass median diameter ($D_{50}$).

(Preparation of Porous Support)

The green body for porous support was extruded to prepare a cylindrical compact. The compact was dried at room temperature, and then heat treated at 1050° C. for 2 hours, followed by further firing at 1300° C. for 2 hours to prepare a porous support.

Reference Example 2

To 99.7 parts by mass of the forsterite powder used in Reference Example 1, 0.3 parts by mass of a high purity strontium carbonate powder (purity of 99.4% or higher) was added, and wet-ground and mixed using a ball mill, followed by spray-drying to prepare a forsterite mixture powder containing 0.3 mass % of strontium carbonate. Then, 100 parts by mass of the mixture powder was mixed with 8 parts by mass of a binder (methyl cellulose-based water-soluble polymer) using a high-speed mixer. Further, 20 parts by mass of a solvent (water) was added thereto and mixed together using a high-speed mixer. The mixture thus obtained was kneaded with a kneader and deaerated with a vacuum kneader. Thus, a green body for extrusion was prepared. A porous support was prepared by the same method as that in Reference Example 1.

Reference Example 3

A porous support was prepared in the same manner as in Reference Example 2, except that a forsterite mixture powder was prepared using 99 parts by mass of a forsterite powder and 1 part by mass of a high purity strontium carbonate powder.

(Electron Microscope Observation)

Samples for electron microscope observation were prepared by grinding and lapping the porous supports of Reference Examples 1 to 3 to have smooth surfaces, and heat treating (thermal etching) the porous supports for 30 minutes in the atmosphere with the maximum temperature of 1200° C. These samples were observed using a scanning electron microscope (S-4100 manufactured by Hitachi, Ltd.) at an accelerating voltage of 15 kV with secondary electron images at a magnification of 20,000 to evaluate the structures of the porous supports.

The porous supports of Reference Examples 1 to 3 had a strontium oxide concentration of 0 mass %, 0.2 mass %, and 0.7 mass %, respectively. It was found out from the result of the electron microscope observation that containing strontium increased the diameter of pores, making it possible to improve the gas permeability.

What is claimed is:

1. A solid oxide fuel cell comprising a porous support, an inner electrode, a solid electrolyte, and an outer electrode, each of the inner electrode, the solid electrolyte, and the outer electrode being sequentially laminated on a surface of the porous support, wherein
the porous support consists essentially of forsterite, and
the porous support further has a strontium element concentration of 0.02 mass % to 1 mass % both inclusive in terms of SrO based on a mass of the forsterite.

2. The solid oxide fuel cell according to claim 1, wherein the solid electrolyte comprises lanthanum-gallate-based oxide.

3. The solid oxide fuel cell according to claim 2, wherein an inner electrode side surface region of the porous support has no calcium element or has a calcium element concentration of 0.2 mass % or less in terms of CaO.

4. The solid oxide fuel cell according to claim 3, wherein the porous support comprises a laminate including at least two layers.

5. The solid oxide fuel cell according to claim 1, wherein the porous support has a sulfur concentration of less than 0.01 mass %.

6. The solid oxide fuel cell according to claim 1, wherein the strontium element concentration in the porous support is 0.1 mass % to 0.7 mass % both inclusive in terms of SrO based on a mass of the forsterite.

7. The method according to claim 1, wherein the strontium element concentration in the porous support is 0.1 mass % to 0.7 mass % both inclusive in terms of SrO based on a mass of the forsterite.

* * * * *